United States Patent [19]
Berchem

[11] Patent Number: 4,995,427
[45] Date of Patent: Feb. 26, 1991

[54] PIPE SECTION, ESPECIALLY FOR ABRASIVE AND/OR CORROSIVE MATERIAL PIPELINES

[75] Inventor: Rütger Berchem, Essen, Fed. Rep. of Germany

[73] Assignee: Metalpraecis Berchem & Schaberg Gesellschaft für Metallformgebung mit beschraänkter Haftung, Gelsenkirchen, Fed. Rep. of Germany

[21] Appl. No.: 369,993

[22] Filed: Jun. 22, 1989

[30] Foreign Application Priority Data

Jun. 30, 1988 [DE] Fed. Rep. of Germany ....... 3821985

[51] Int. Cl.⁵ .......................... F16L 19/02; F16L 9/22
[52] U.S. Cl. ............................ 138/155; 138/DIG. 6; 138/145; 138/148; 138/120; 285/55; 406/193
[58] Field of Search .................. 138/DIG. 6, 109, 155, 138/145, 148, 140, 98, 149, 120; 406/193, 191; 285/55, 45, 16; 405/150, 154; 264/36, 269

[56] References Cited
U.S. PATENT DOCUMENTS

| 785,176 | 3/1905 | Mommertz | 406/193 |
| 2,982,311 | 5/1956 | Haskell | 138/109 |
| 3,307,996 | 3/1967 | Keneipp, Jr. | 138/109 |
| 3,650,550 | 3/1972 | West | 138/109 |
| 4,804,207 | 2/1989 | Berchem et al. | 285/16 |
| 4,848,407 | 7/1989 | Smith et al. | 138/97 |

Primary Examiner—James E. Bryant, III
Assistant Examiner—Gary K. Graham
Attorney, Agent, or Firm—Herbert Dubno

[57] ABSTRACT

A pipe section of an outer metallic pipe and a nonmetallic inner lining is provided so that the lining can be removed. To this end, the lining consists of lining segments, the terminal members of which are braced against the ends of the pipe in a form fitting manner and the successive lining segments can interfit with, for example, complementary frustoconical formations.

10 Claims, 2 Drawing Sheets

PIPE SECTION, ESPECIALLY FOR ABRASIVE AND/OR CORROSIVE MATERIAL PIPELINES

CROSS REFERENCE TO RELATED APPLICATIONS

This application is related to the commonly assigned copending applications: Ser. No. 07/247,113 filed 20 September 1988; now U.S. Pat. No. 4,838,312 Ser. No. 07/307,383 filed 6 February 1989 now U.S. Pat. No. 4,932,432 and Ser. No. 07/316,755 filed 28 February 1989 now U.S. Pat. No. 4,936,546.

Reference can also be made to the following patents on similar subjects: U.S. Pat. No. 4,795,133 issued 3 January 1989; U.S. Pat. No. 4,791,953 issued 20 December 1988; U.S. Pat. No. 4,771,803 issued 20 September 1988 and U.S. Pat. No. 4,815,704 issued 28 March 1989.

FIELD OF THE INVENTION

My present invention relates to a pipe section, especially for pipe carrying abrasive material and fluids which can be either corrosive or noncorrosive. More particularly, the invention relates to a lined pipe section, i.e. or pipe section comprising an outer metallic pipe member forming an outer shell and a wear-resistant nonmetallic lining disposed within this shell.

BACKGROUND OF THE INVENTION

Lined pipe lines generally have a metallic pipe or tube whose inner surface is bonded to a nonmetallic lining material which can be corrosion-resistant and wear-resistant.

As used herein, "wear-resistant" is intended to both abrasive and/or corrosive attack. A pipe section according to the invention will be considered to be a length of piping which can be formed at its ends with means enabling it to be connected to other pipe sections and fittings to form the pipe line and having a certain length. Generally, in the pipelines with which the invention is concerned, an abrasive or simultaneously abrasive and corrosive fluid medium will be conducted through the pipeline.

The pipe length or section can be connected to other sections to form the pipe line by welding or can have flanges so that a flange connection can join the pipe sections together.

Pipe sections have been fabricated heretofore, as has already been noted, with a lining of nonmetallic material bonded fixedly to the inner surface of the outer shell or pipe which can be composed of a metallic material.

The nonmetallic material forming the lining is, of course, selected to resist the abrasive and/or corrosive stresses or attack which may be applied by the following medium. For example, the lining may be inappropriate plastic or synthetic resin material. Linings of basalt or other inorganic material may also be used and various forms of internally coating the metallic pipe lengths with the lining material may be employed.

Lined pipe sections can be used for the displacement of bulk materials, e.g. for the blowing of bulk fillers into chambers or compartments of subterranean structures in mining or the like.

Notwithstanding the projection of a lining resistant to erosion, substantial wear of the lining does occur with time. This, of course, eliminates the useful life of the pipe section.

When the lining wears beyond a certain point, the entire piping section must be removed and discarded.

Obviously, this approach is expensive, especially when the lining material itself and the form in which it is applied to the pipe section are expensive or involve expensive processes.

In certain cases, wear-resistant materials which have been found to be particularly effective for the handling of highly abrasive bulk materials, for example, certain industrial ceramics and especially nonadhesive synthetic resins used as lining material utilizing conventional techniques.

OBJECTS OF THE INVENTION

It is the principal object of the present invention to provide a pipe section having an outer metallic pipe length and a wear-resistant nonmetallic lining which will avoid drawbacks of earlier systems of the type described.

Another object of this invention is to provide a piping length having an outer metallic pipe and a wear resistant nonmetallic lining which will permit replacement of this lining after it has been subjected to a certain amount of wear and herein the replacement can be effected simply and economically.

Yet another object of the invention is to provide a piping section which enables the use of wear resistant lining materials which have not, for structural reasons, been capable of being used effectively heretofore.

SUMMARY OF THE INVENTION

These objects and others which will become apparent hereinafter are attained, in accordance with the present invention by providing the lining of a multiplicity of tubular lining segments each of which is shorter than the metallic pipe sections in which the segments are provided and in which the segments are disposed end to end so as to collectively extend the full length of the pipe section, the lining having at least one terminal pipe section form fittingly placed against the respective end of the outer pipe.

The resulting pipe section can be so incorporated into a pipe line that the braced end of the succession of lining segments cannot shift out of or in the outer pipe member by the manner in which the outer pipe member is connected to the next pipe member of the pipeline. Upon separation of the pipe section from the pipeline, however, the segments can be slipped out and replaced.

Preferably such form-fitting bracing of terminal lining segments can be provided at both sides each of the junction and at both ends of each of the pipe sections. For example, a terminal segment may be formed with an outwardly extending collar which can be placed against the collar of a terminal segment of an adjoining pipe section connected to form the pipe line with the first pipe section, or can abut an end face of the outer pipe to provide the bracing.

The pipe lining segments can abut one another end to end in planes perpendicular to the axis of the pipe section or successive lining segments can have mating configurations, e.g. complimentary frustoconical configurations.

To brace the lining segments of at least and preferably both of the terminal segments, it is advantageous to provide the outer pipe with an annular groove into which the collar fits substantially flush.

The terminal lining segments of adjoining pipe sections can then be pressed against one another at the point which is formed, e.g. by welding or by a flange connection of the pipe sections.

The lining can be constituted of various materials, including materials which are highly brittle and deformable. For example, glass can serve as a suitable lining material.

The pressure sensitivity of the lining can be eliminated by allowing a pressure balance across the wall of the lining segments by permitting the flowable medium to lie on opposite sides of the wall at substantially the same pressure. This can be achieved by leaving gaps between adjoining lining segments in each pipe section.

In this connection, it is a preferred embodiment of the invention to provide spacers between the outer surface of each lining segment and the inner surface of the inner wall of the metallic outer pipe. Such spacers can be in the form of longitudinally extending ribs molded onto the lining segments and engaging the inner surface of the metal pipe.

The lining segments can be composed of industrial ceramic, from glass or even from synthetic resin materials.

In the case of pipelines in which there is flow of abrasive medium, but the medium is noncorrosive, it suffices to make the outer pipe from conventional pipe making steels. When, of course, an abrasive and also corrosive medium is intended to transverse the pipe section, the outer pipe can also be composed of conventional pipe making steel, although the inner surface of the pipe may then be lined, in accordance with the invention with an anticorrosion coating. The anticorrosion coating a chemically or galvanically applied protective layer against corrosion, selected depends upon the nature of the corrosive material. The anticorrosion coating suffices to protect the metal pipe even when abrasive materials transverse the passage surrounded by the lining, since high velocity flow of abrasive does not an intercontact occur.

The piping element of the invention, for connections in a pipe line thus can comprise:

an outer pipe section of metallic material having ends connectable in a pipeline; and an inner lining extending substantially over the entire interior length of the outer pipe section and formed by a plurality of tubular lining segments disposed end to end in the outer pipe section, composed of a nonmetallic material and removably disposed in the outer pipe section, the segments each being shorter than the outer pipe section, the segments including terminal segments at opposite ends of the lining formfittingly engaging and braced against respective ends of the outer pipe section.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

The pipe section of the invention comprises a metallic outer pipe 1 and an inner wear resistant nonmetallic lining.

Figure 1:
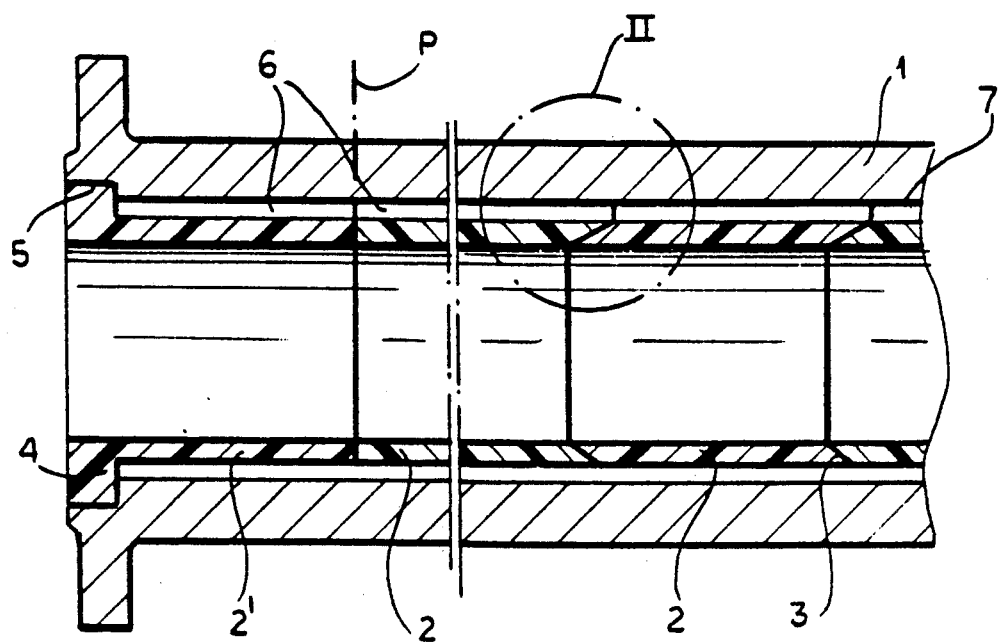
FIG. 1 is a longitudinal section (axial section) through a piping section according to the invention, partly broken away.
Figure 2:
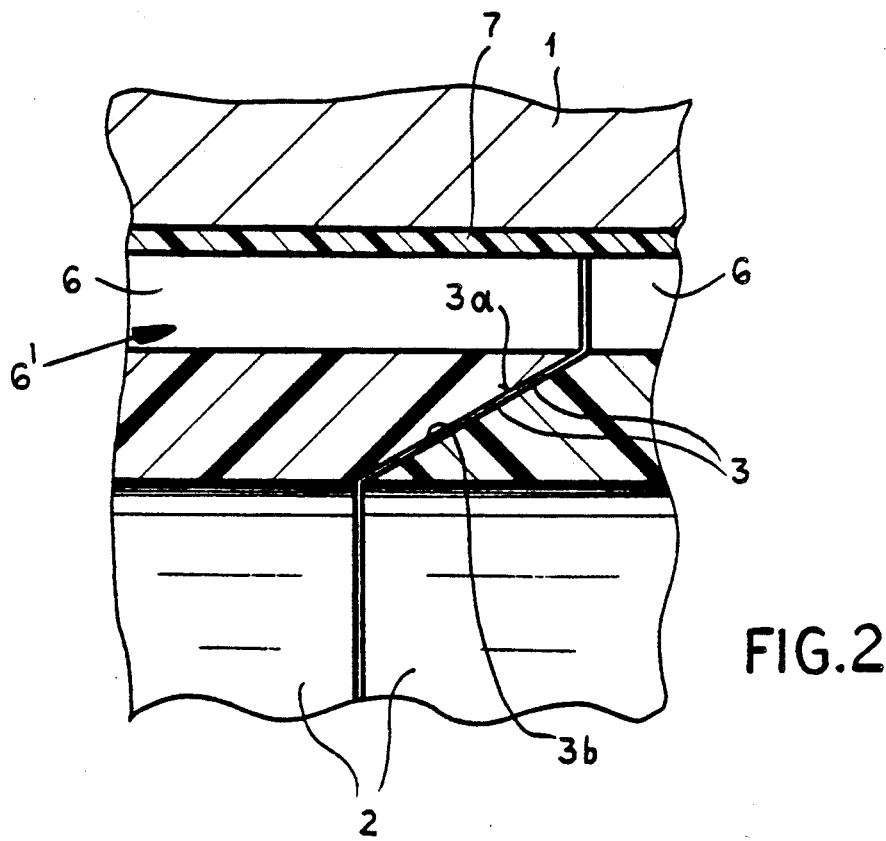
FIG. 2 is a detail of the region II of FIG. 1.

As can be seen from FIGS. 1 and 2, the lining consists of a plurality of tubular lining segments 2, each of which is shorter than the outer pipe 1 and all of which are received in end-2-end relationship in the outer pipe 1.

At least the one end, the terminal lining segment 2' is braced against the end of the outer pipe 1 and form fittingly engages it in the embodiment illustrated, the terminal lining segment 2' and the proximal lining segment 2 abut one another contact substantially in a transverse plane P.

The remaining lining segments interfit by complementary frustoconical formations. These formations include female formations 3a and male formations 3b which together can define small gaps or clearances.

The terminal segments 2' are provided with outer extending circumferential collars 4 which are received in respectfully annular grooves 5 in close-fitting or snug relationship.

In the embodiment illustrated, moreover, the gaps 3 permit fluid to enter spaces 6' formed around the lining segments and inwardly of the outer pipe 1 so that pressure equalization is provided across the walls of the lining segments.

Figure 3:
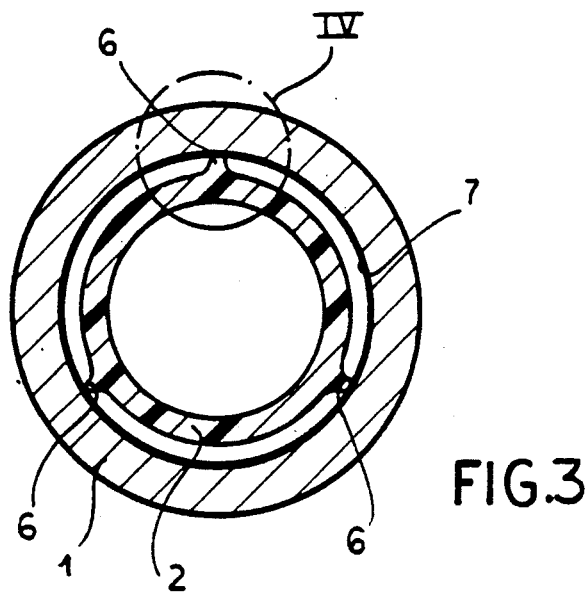
FIG. 3 is a transverse cross section through the piping section of FIG. 2.
Figure 4:
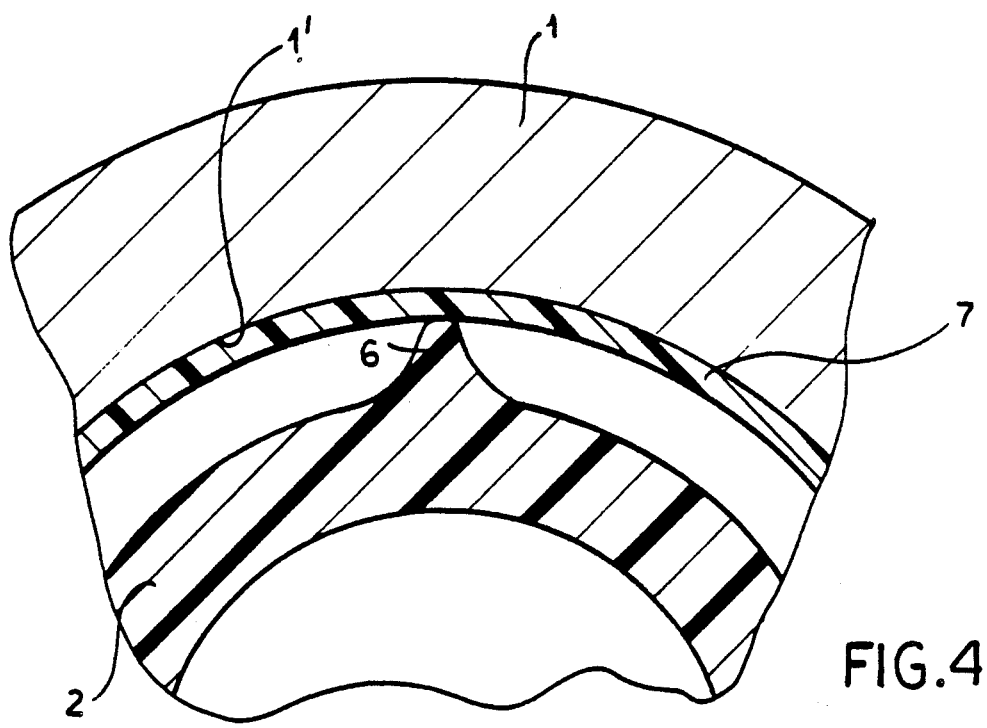
FIG. 4 is a detail of region IV of FIG. 3.

The lining segments are also braced with equispaced ribs 6, shown in cross section in FIGS. 3 and 4. These 3 angularly equispaced ribs extend longitudinally or axially along the respective pipe segments. The pipe segment 2 can be composed of an industrial ceramic, glass or synthetic resin material and other materials can be used as well.

As can be seen from FIGS. 3 and 4, when an abrasive and corrosive medium is being conducted through the pipe line, the inner surface 1 of the outer pipe 1 can be provided with a corrosion-preventing coating 7 which can be chemically or galvanically applied. This coating can be a synthetic resin, lacquer or paint or a metallic coating.

When, of course, the medium transported through the pipe line is noncorrosive but is abrasive only, the coating 7 can be omitted.

I claim:

1. A piping length, comprising:

an outer pipe section of metallic material having ends connectable in a pipeline; and an inner lining extending substantially over the entire interior length of said outer pipe section and formed by a plurality of tubular lining segments disposed end to end in said outer pipe section, composed of a nonmetallic material and removably disposed in said outer pipe section, said segments each being shorter than said outer pipe section, said segments including terminal segments at opposite ends of said lining formfittingly engaging and braced against respective ends of said outer pipe section.

2. The piping length defined in claim 1 wherein adjoining ends of successive segments of said lining substantially butt against one another and are substantially flush with one another.

3. The piping length defined in claim 1 wherein adjoining ends of successive segments of said lining are provided with mating frustoconical formations.

4. The piping length defined in claim 1 wherein at least one of said terminal segments has a circumferential collar received in an annular groove formed in a respective end of said outer pipe section.

5. The piping length defined in claim 1 wherein said nonmetallic material is an industrial ceramic.

6. The piping length defined in claim 1 wherein said nonmetallic material is a wear-resistant plastic.

7. The piping length defined in claim 1 for a pipeline for an abrasive but noncorrosive medium, wherein said outer pipe section is composed of ordinary pipe steel.

8. The piping length defined in claim 1 for a pipeline for an abrasive and corrosive medium, wherein said outer pipe section is composed of ordinary pipe steel and is internally provided with an anti-corrosion coating interposed between said metallic material and said lining.

9. The piping length defined in claim 8 wherein said anti-corrosion coating is a chemically-applied protective layer.

10. The piping length defined in claim 8 wherein said anti-corrosion coating is a galvanically-applied protective layer.

* * * * *